(No Model.)
E. A. COCHRAN.
PNEUMATIC TIRE.
No. 549,059. Patented Oct. 29, 1895.
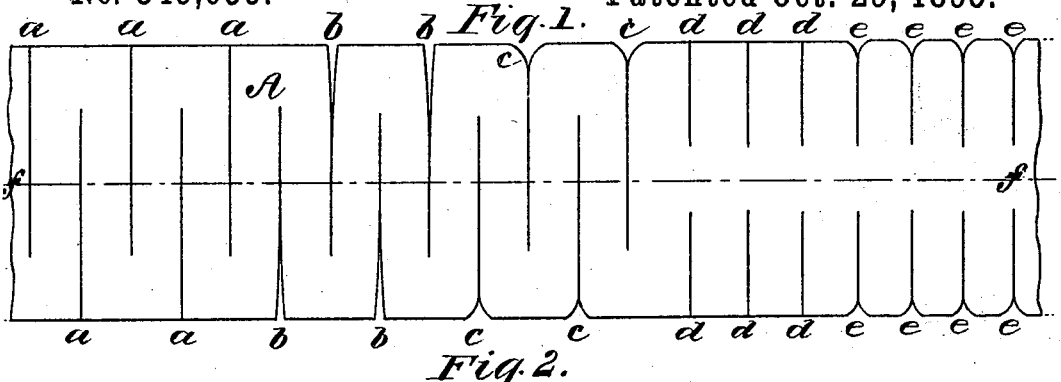
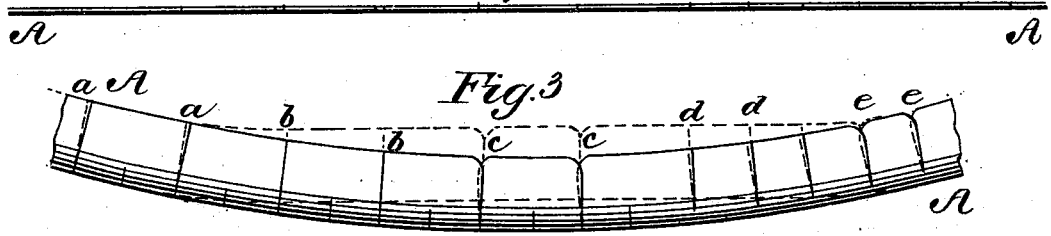
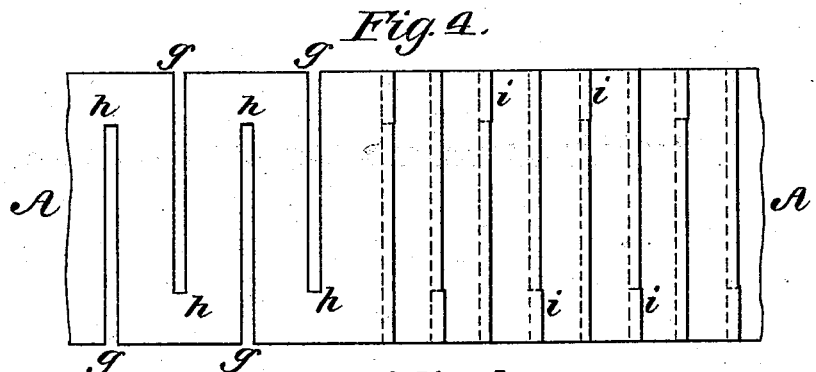
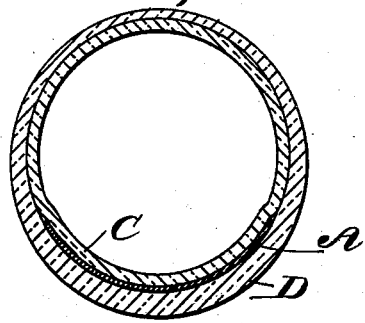
WITNESSES:
INVENTOR,
Edward A. Cochran,
BY Henry F. Parker
ATTORNEY.

UNITED STATES PATENT OFFICE.

EDWARD A. COCHRAN, OF BROOKLYN, ASSIGNOR OF ONE-HALF TO PHILIP VAN VOLKENBURGH, OF NEW YORK, N. Y.

PNEUMATIC TIRE.

SPECIFICATION forming part of Letters Patent No. 549,059, dated October 29, 1895.

Application filed December 31, 1894. Serial No. 533,387. (No model.)

*To all whom it may concern:*

Be it known that I, EDWARD A. COCHRAN, a citizen of the United States, and a resident of Brooklyn, in the county of Kings and State of New York, have invented certain new and useful Improvements in Pneumatic Tires, of which the following is a specification.

My invention relates to pneumatic tires for bicycles, carriages, or other vehicles; and its object is to cheaply produce a non-puncturable armor that shall readily yield in both longitudinal and lateral flexure, and also in a measure lend elastic resiliency to the rubber tire, adding to the efficiency of the air-cushion.

An advantage of my improved construction consists in that the armor, while admitting of longitudinal elasticity, permitting slight extension and contraction in the length of the tire as necessary for easy running, and as acquired heretofore by the use of separate transverse plates riveted together or coiled strips, may be cheaply constructed entirely of one piece of sheet metal, rawhide, or other material, avoiding rivets or other connections, as in said plates, or extravagant amount of material, as in said coils.

In order to enable others skilled in the art to which my invention appertains to understand and use the same, I will proceed to describe its construction and subsequently point out in the appended claims its novel characteristics.

Referring to the accompanying drawings, Figure 1 is a plan view of a cut blank unbent, illustrating various arrangements of incisions. Fig. 2 is an edge view of Fig. 1. Fig. 3 is a side view of the armor, Fig. 1, bent into normal shape. Fig. 4 is a plan view of a modified cut blank partly plaited. Fig. 5 is an edge view of Fig. 4. Fig. 6 is a cross-section of a tire containing the armor.

The blank A, of thin spring sheet metal, rawhide, or other suitable material, is composed of a continuous strip cut by dies, rolls, or other means with lateral incisions, such as $a, b$, or $c$, alternately arranged on opposite sides of the strip. The incisions extend beyond the center line $ff$ to afford the greatest possible elasticity, both laterally and longitudinally. The form or arrangement of incisions chosen are to be repeated continuously alike throughout the length of the strip A equal to the circumference of the tire.

The blank A, after being cut, is then rolled into a curved form in cross-section, as seen in Figs. 3 and 6, also having the circumferential curvature of the tire, as seen in Fig. 3, and the incisions close, so as to overlap, or if cut as at $b$ their edges abut; but the overlap is preferable, so as to form a continuous flexible armor. The armor is interposed between the inflated tube C and the outer shoe or covering D, as seen in Fig. 6, or may be cemented, vulcanized, or otherwise attached to any well known or suitable construction of tire.

When passing over the road, the armor A yields in the manner indicated by dotted lines in Fig. 3.

The modification in Figs. 4 and 5 consists in plaiting the material from the end of each incision $g$ to the opposite edge. This is done by introducing a slight cross-cut at $h$, as shown in the left-hand part of Fig. 4, before folding. The plaits $i$ may be formed by machinery before the plate is rolled to its cross-sectional curvature. The joints will thereby overlap at all flexures of the tire at the edges of the incisions $g$.

I claim—

1. An armor for pneumatic tires consisting of a thin strip of flexible non-puncturable material having lateral incisions from both edges crossing the center of the strip to permit longitudinal contraction and expansion of the strip.

2. An armor for pneumatic tires consisting of a continuous strip having lateral incisions alternately located at opposite edges along the length of said strip, and crossing the center line of said strip, substantially as described.

3. An armor for pneumatic tires consisting of a continuous thin strip having lateral incisions and plaited from the end of each incision to the opposite edge, substantially as and for the purpose set forth.

4. The combination with a pneumatic tire of a non-puncturable armor contained in or attached to its structure, consisting in a continuous thin strip having lateral incisions crossing the center of said strip, substantially as described.

5. The combination with a pneumatic tire comprising an inflated inner tube, and an outer tread of a non-puncturable continuous strip of armor having lateral incisions in its edges extending across the center of the strip for the purposes set forth, and interposed between said tube and tread to protect the tube.

Signed at New York, in the county of New York and State of New York, this 28th day of December, A. D. 1894.

EDWARD A. COCHRAN.

Witnesses:
J. KENNEDY,
K. M. TUCKER.